US011851074B2

(12) United States Patent
Ma et al.

(10) Patent No.: US 11,851,074 B2
(45) Date of Patent: Dec. 26, 2023

(54) SYSTEM AND METHOD OF LARGE-SCALE AUTONOMOUS DRIVING VALIDATION

(71) Applicant: CYNGN, INC., Menlo Park, CA (US)

(72) Inventors: Biao Ma, Sunnyvale, CA (US); Lior Tal, San Diego, CA (US)

(73) Assignee: CYNGN, INC., Menlo Park, CA (US)

( * ) Notice: Subject to any disclaimer, the term of this patent is extended or adjusted under 35 U.S.C. 154(b) by 88 days.

(21) Appl. No.: 17/822,392

(22) Filed: Aug. 25, 2022

(65) Prior Publication Data

US 2023/0062116 A1 Mar. 2, 2023

Related U.S. Application Data

(60) Provisional application No. 63/366,738, filed on Jun. 21, 2022, provisional application No. 63/237,038, (Continued)

(51) Int. Cl.
*B60W 50/02* (2012.01)
*B60W 50/04* (2006.01)
*G05D 1/00* (2006.01)

(52) U.S. Cl.
CPC ...... *B60W 50/0205* (2013.01); *B60W 50/045* (2013.01); *G05D 1/0088* (2013.01); (Continued)

(58) Field of Classification Search
CPC ............ B60W 50/0205; B60W 50/045; G05D 1/0088
(Continued)

(56) References Cited

U.S. PATENT DOCUMENTS

2020/0394916 A1* 12/2020 Salles ................... G08G 1/0133
2021/0094561 A1*  4/2021 Jiang ..................... B60W 10/18
(Continued)

OTHER PUBLICATIONS

PCT International Search Report and Written Opinion issued in corresponding application No. PCT/US2022/041599, dated Nov. 3, 2022.

*Primary Examiner* — Peter D Nolan
*Assistant Examiner* — Luke Huynh
(74) *Attorney, Agent, or Firm* — Maschoff Brennan

(57) ABSTRACT

An autonomous driving validation system may include a primary advanced autonomy system located on board an autonomous vehicle (AV) that includes sensors, computing subsystems, and a drive-by-wire system. The primary advanced autonomy system may be configured to process first computations relating to a driving operation of the AV. The autonomous driving validation system may also include an off-board autonomous cloud computing system that includes cloud computing subsystems. The off-board autonomous cloud computing system may be configured to process second computations that are similar to the first computations processed by the primary advanced autonomy system. The autonomous driving validation system may include processors and non-transitory computer-readable storage media configured to store instructions that, in response to being executed, cause a system to perform operations relating to whether a likelihood of a problem arising during driving operation of the AV is above a threshold and generating a notification message regarding the problem.

20 Claims, 6 Drawing Sheets

Related U.S. Application Data filed on Aug. 25, 2021, provisional application No. 63/237,036, filed on Aug. 25, 2021, provisional application No. 63/237,035, filed on Aug. 25, 2021.

(52) U.S. Cl.
CPC ............... *B60W 2050/046* (2013.01); *G05D 2201/0213* (2013.01)

(58) Field of Classification Search
USPC ........................................................ 701/31.7
See application file for complete search history.

(56) References Cited

U.S. PATENT DOCUMENTS

| | | | |
|---|---|---|---|
| 2021/0314417 A1* | 10/2021 | Chen | H04L 67/59 |
| 2022/0119006 A1* | 4/2022 | Ariyaratne | B60W 60/001 |

\* cited by examiner

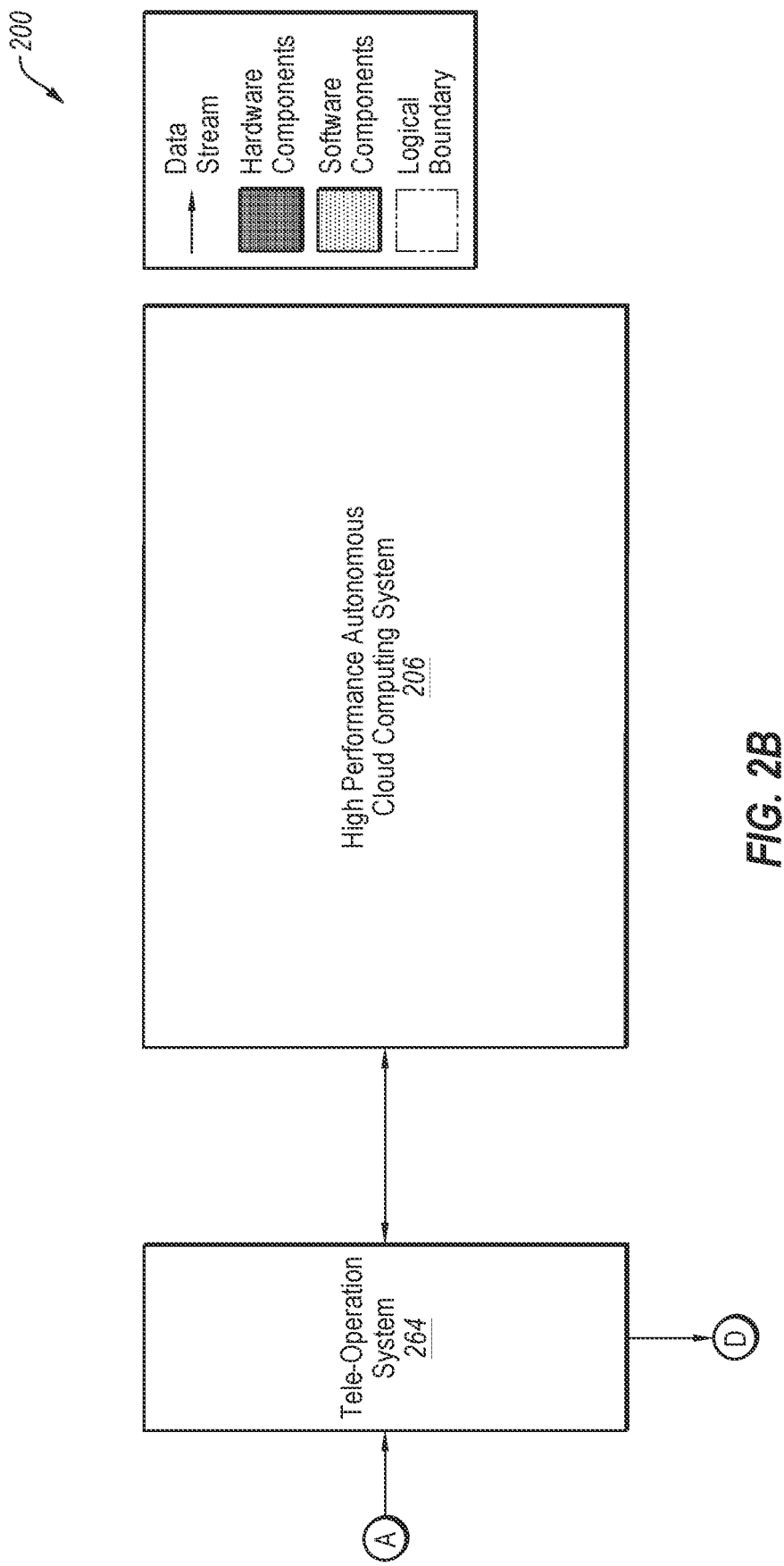

SYSTEM AND METHOD OF LARGE-SCALE AUTONOMOUS DRIVING VALIDATION

CROSS-REFERENCE TO RELATED APPLICATIONS

This application claims the benefit of U.S. Patent Application Ser. No. 63/237,035, filed on Aug. 25, 2021, U.S. Patent Application Ser. No. 63/237,036, filed on Aug. 25, 2021, U.S. Patent Application Ser. No. 63/237,038, filed on Aug. 25, 2021, and U.S. Patent Application Ser. No. 63/366,738, filed on Jun. 21, 2022; the disclosures of which are incorporated herein by reference in their entireties.

FIELD OF THE INVENTION

The present disclosure generally relates to a system and method of large-scale autonomous driving validation.

BACKGROUND

An autonomous vehicle may scan an environment in which the autonomous vehicle is located using one or more sensors positioned on and/or around the autonomous vehicle. The autonomous vehicle may detect objects based on data collected by the sensors and avoid objects in a path of travel of the autonomous vehicle based on the detected objects.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include an autonomous driving validation system that includes a primary advanced autonomy system located on board an autonomous vehicle (AV) that includes one or more sensors, one or more computing subsystems, and a drive-by-wire system, the primary advanced autonomy system being configured to process first computations relating to a driving operation of the AV and to store first instructions that, in response to being executed, cause the autonomous driving validation system to perform first operations. The first operations may include obtaining sensor data relating to the AV and a total measurable world around the AV. The first operations may also include processing the first computations relating to the driving operation of the AV based on the obtained sensor data. The autonomous driving validation system may include an off-board autonomous cloud computing system that includes one or more cloud computing subsystems, the off-board autonomous cloud computing system being configured to process second computations that are the same as or similar to the first computations processed by the primary advanced autonomy system and to store second instructions that, in response to being executed, cause the autonomous driving validation system to perform second operations. The second operations may include obtaining sensor data relating to the AV and a total measurable world around the AV. The second operations may also include processing the second computations based on the obtained sensor data. The second operations may additionally include determining whether a likelihood of a problem arising during the driving operation of the AV is above a threshold based on a comparison between the first computations and the second computations. Responsive to determining that the likelihood of the problem arising is above the threshold, the operations may include generating a notification message regarding the problem that is likely to arise during the driving operation of the AV based on a difference between the first computations and the second computations.

In some embodiments, the autonomous driving validation system may further include a fleet management and analytics system located off-board the AV, the fleet management and analytics system being configured to obtain information from and send information to one or more first AVs included in a group of AVs, the information relating to one or more second AVs included in the group. The fleet management and analytics system may be included as part of the off-board autonomous cloud computing system.

In some embodiments, the comparison between the first computations and the second computations may involve comparing the first computations and the second computations over a period of time.

In some embodiments, determining whether the likelihood of the problem arising during the driving operation of the AV is above the threshold may be determined by a machine-learning process and may include determining at least one of: a data-collection reliability of the one or more sensors, identifying a malfunctioning component of the AV, and identifying miscalibration of one or more of the sensors.

In some embodiments, the off-board autonomous cloud computing system may be a software beta-testing system, and the second computations may include updated computations relative to the first computations.

In some embodiments, the off-board autonomous cloud computing system may be a software-auditing system, and the second computations may be the same as the first computations.

One or more embodiments of the present disclosure may include a method that includes obtaining, by the primary advanced autonomy system and by the off-board autonomous cloud computing system, sensor data relating to the AV and a total measurable world around the AV. The method may also include processing, by the primary advanced autonomy system, the first computations relating to the driving operation of the AV based on the obtained sensor data and processing, by the off-board autonomous cloud computing system, the second computations based on the obtained sensor data. The method may additionally include determining, by the off-board autonomous cloud computing system, whether a likelihood of a problem arising during the driving operation of the AV is above a threshold based on a comparison between the first computations and the second computations. Responsive to determining that the likelihood of the problem arising is above the threshold, the operations may include generating a notification message regarding the problem that is likely to arise during the driving operation of the AV based on a difference between the first computations and the second computations.

In some embodiments, the comparison between the first computations and the second computations may involve comparing the first computations and the second computations over a period of time.

In some embodiments, determining whether the likelihood of the problem arising during the driving operation of the AV is above the threshold may be determined by a machine-learning process and may include determining at least one of: a data-collection reliability of the one or more sensors, identifying a malfunctioning component of the AV, and identifying miscalibration of one or more of the sensors.

In some embodiments, the off-board autonomous cloud computing system may be a software beta-testing system, and the second computations may include updated computations relative to the first computations.

In some embodiments, the off-board autonomous cloud computing system may be a software-auditing system, and the second computations may be the same as the first computations.

In some embodiments, the method may further include sending the notification message to a fleet management and analytics system that is configured to obtain information from and send information to one or more first AVs included in a group of AVs, the information relating to one or more second AVs included in the group. The fleet management and analytics system may be included as part of the off-board autonomous cloud computing system.

One or more embodiments of the present disclosure may include one or more non-transitory computer-readable storage media configured to store instructions that, in response to being executed, cause a system to perform operations. The operations may include obtaining, by the primary advanced autonomy system and by the off-board autonomous cloud computing system, sensor data relating to the AV and a total measurable world around the AV. The operations may also include processing, by the primary advanced autonomy system, the first computations relating to the driving operation of the AV based on the obtained sensor data and processing, by the off-board autonomous cloud computing system, the second computations based on the obtained sensor data. The operations may additionally include determining, by the off-board autonomous cloud computing system, whether a likelihood of a problem arising during the driving operation of the AV is above a threshold based on a comparison between the first computations and the second computations. Responsive to determining that the likelihood of the problem arising is above the threshold, the operations may include generating a notification message regarding the problem that is likely to arise during the driving operation of the AV based on a difference between the first computations and the second computations.

In some embodiments, the comparison between the first computations and the second computations may involve comparing the first computations and the second computations over a period of time.

In some embodiments, determining whether the likelihood of the problem arising during the driving operation of the AV is above the threshold may be determined by a machine-learning process and may include determining at least one of: a data-collection reliability of the one or more sensors, identifying a malfunctioning component of the AV, and identifying miscalibration of one or more of the sensors.

In some embodiments, the off-board autonomous cloud computing system may be a software beta-testing system, and the second computations may include updated computations relative to the first computations.

In some embodiments, the off-board autonomous cloud computing system may be a software-auditing system, and the second computations may be the same as the first computations.

In some embodiments, the operations may further include sending the notification message to a fleet management and analytics system that is configured to obtain information from and send information to one or more first AVs included in a group of AVs, the information relating to one or more second AVs included in the group. The fleet management and analytics system may be included as part of the off-board autonomous cloud computing system.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which:

FIGS. 2A-2C illustrate an example large-scale autonomous driving validation system with autonomy intelligence for high-performance cloud computation according to the present disclosure;

DETAILED DESCRIPTION

Figure 1:
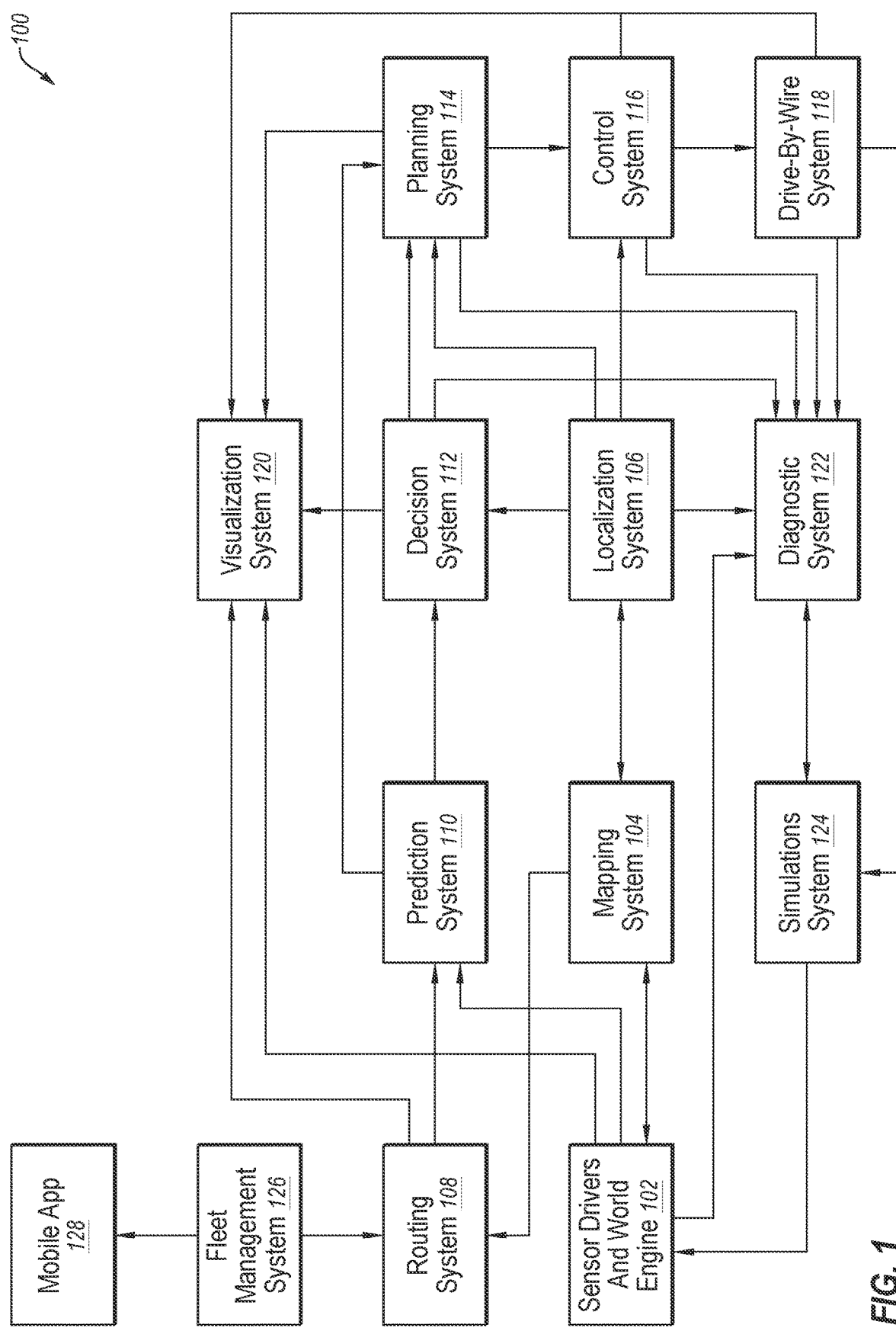
FIG. 1 illustrates an example embodiment of an autonomous driving system according to at least one embodiment of the present disclosure.

A large-scale autonomous driving validation system for piloting an autonomous vehicle (AV) according to the present disclosure may be configured to communicate with an off-board cloud computing system such that the large-scale autonomous driving validation system may include autonomous driving functionality. Existing autonomous driving systems may include a tele-operation system that provides sensor data to a remote tele-operator who controls operations and movement of the vehicle associated with the sensor data, such as that experienced with unmanned aerial vehicles (UAVs), remote control drones, etc., in situations in which the AV is not capable of autonomous operation. In some embodiments, large-scale autonomous driving validation for a vehicle and/or an AV may be used to pilot the vehicle and/or the AV in response to determining that an in-vehicle operator and/or an on-board autonomous driving system would benefit from tele-operation assistance. In some situations, large-scale autonomous driving validation of a given vehicle may begin in response to determining that the in-vehicle operator and/or the on-board autonomous driving system are inoperable. For example, large-scale autonomous driving validation of a given AV may be triggered by the given AV identifying that it has gotten stuck and does not see a navigable path to become unstuck.

Such large-scale autonomous driving validation systems may or may not include systems and/or elements that facilitate autonomous driving capabilities to assist a tele-operator in controlling and piloting the vehicle. The large-scale autonomous driving validation system according to the present disclosure may improve tele-operation and/or autonomous driving of vehicles by providing autonomous driving assistance for tele-operation of the AV. Additionally or alternatively, the off-board cloud computing system may include more computational resources and/or better computing specifications relative to an on-board computing system for the AV such that tele-operation of the AV may be improved.

In some embodiments, a large-scale autonomous driving validation system according to the present disclosure may involve an off-board computing system that includes computing subsystems configured to determine autonomous driving instructions for one or more AVs and/or supervise performance of autonomous driving operations and computations of the one or more AVs. The large-scale autonomous driving validation system according to the present disclosure may provide an improvement over existing autonomous driving systems that facilitate remote operation of a single vehicle by a single user by facilitating remote supervision of multiple AVs by a single user. In these and other embodiments, a user may review computations and/or decisions made by one or more computing subsystems associated with one or more AVs rather than having the user direct the driving operations of the AVs themselves.

The large-scale autonomous driving validation system according to the present disclosure may, among other things, facilitate and improve remote supervision of groups of AVs that include tens, hundred, thousands, or millions of AVs. For example, the large-scale autonomous driving validation system may be implemented by an insurance company to audit performance of AVs for car insurance policy adherence; by reviewing the computations and driving decisions of a given AV included in a group of AVs communicatively coupled with the large-scale autonomous driving validation system, the insurance company may identify whether the given AV is driving according to traffic safety rules, in need of vehicle maintenance, at fault in a car accident, some combination thereof, or any other properties of the given AV. As an additional or alternative example, the large-scale autonomous driving validation system may be implemented to test, develop, and/or review software updates that may or may not be implemented by the computing subsystems corresponding to one or more of the AVs included in the group. As an additional or alternative example, the large-scale autonomous driving validation system may be implemented by an automobile manufacturer, a traffic authority agency, a car repair service, or any other entities to audit the safety of the AVs and/or preemptively determine when vehicle malfunctions are likely to occur. As an additional or alternative example, the large-scale autonomous driving validation system may be implemented may be implemented by a government to monitor for which entity bears responsibility should an accident occur or damage be caused.

Additionally or alternatively, the large-scale autonomous driving validation system according to the present disclosure may improve load balancing between AVs included in the same group. The off-board cloud computing system of the large-scale autonomous driving validation system may be configured to identify a current computation load of one or more AVs included in the group. The large-scale autonomous driving validation system may re-allocate computations being performed by a first AV that is experiencing a high computational load to a second AV that is not processing a high computational load at that time. Additionally or alternatively, the off-board cloud computing system of the large-scale autonomous driving validation system may perform one or more of the computations to assist operations of the first AV.

Additionally or alternatively, the large-scale autonomous driving validation system according to the present disclosure may improve system-level predictive maintenance of the AVs included in the group. Because the large-scale autonomous driving validation system is configured to monitor the computational outputs and processes of each AV included in a given group of AVs, the large-scale autonomous driving validation system may identify changes in the performances of computing subsystems associated with a given AV in the given group. Based on the changes in the computing subsystems' performances over time, the large-scale autonomous driving validation system may preemptively identify possible issues being experienced by the given AV. For example, the large-scale autonomous driving validation system may determine that brake pads and/or tire treads of the given AV are wearing out based on observing a braking profile and/or a deceleration rate of the given AV over time. As an additional or alternative example, the large-scale autonomous driving validation system may identify environmental material build-up on a surface of a given AV that obstructs data collection by one or more sensors of the given AV based on changes in the data collected by the sensors over time. Additionally or alternatively, the large-scale autonomous driving validation system may identify miscalibration of one or more sensors, not up-to-date map assets being used in localization and/or routing of a given AV, errors in semantic map elements being used by the given AV for decision-making, malfunctioning components in a drive-by-wire system of the given AV, any other errors being experienced by the given AV, or some combination thereof. In these and other embodiments, a system-level view into the operation of the AVs may include machine learning (ML) or other predictive intelligence that may identify correlations between observed anomalies and corresponding issues. For example, a ML system may identify a correlation between a variation in braking profile that corresponds to brakes being worn down to the point of replacements, and another variation in the braking profile that corresponds to low tire tread or low air pressure in tires.

Embodiments of the present disclosure will be explained with reference to the accompanying drawings.

FIG. 1 illustrates an example embodiment of an autonomous driving system 100 according to at least one embodiment of the present disclosure. The autonomous driving system 100 may include one or more computer systems and/or software modules configured to perform one or more operations involved with driving an autonomous vehicle. Various aspects of the autonomous driving system 100 may be included on-board with the autonomous vehicle itself, or with a remote system in communication with the autonomous vehicle, such as a cloud computing system, a server, or a mobile device. In some embodiments, the autonomous driving system 100 may include sensor drivers and a world engine 102 that is configured to capture and process sensor data relating to an environment in which the autonomous vehicle travels, such as information relating to what objects are present in the environment and where such objects are located relative to the autonomous vehicle. The sensor data related to the autonomous vehicle's environment may be sent to a mapping system 104 to generate a virtual map of the environment. In some embodiments, the virtual map may be sent from the mapping system 104 back to the sensor drivers and world engine 102 to provide a map on which the sensor data relating to environmental objects may be oriented. Additionally or alternatively, the virtual map may provide a map onto which environmental topography may be plotted.

The virtual map of the mapping system 104 may be sent to a localization system 106 and/or a routing system 108. The localization system 106 may provide an estimated location of the autonomous vehicle within the environment and/or the virtual map, and the routing system 108 may compute a route between the estimated location of the autonomous vehicle to a designated destination along a valid path included in the virtual map.

In some embodiments, the sensor data of the sensor drivers and world engine 102 may be sent to a prediction system 110 that is configured to predict movement and/or trajectories of one or more objects in the vicinity of the autonomous vehicle and/or the autonomous vehicle itself. A decision system 112 may obtain the predicted object trajectories from the prediction system 110, and based on a location of the autonomous vehicle as determined by the localization system 106, the decision system 112 may determine one or more driving decisions according to various driving rules. The driving decisions determined by the decision system 112 may be sent to a planning system 114 that processes, parses, and/or queues the driving decisions for a downstream control system 116. In some embodiments, the control system 116 may generate control signals that are obtained by a drive-by-wire system 118 or another actuation system that controls one or more operations of the autonomous vehicle.

In some embodiments, the autonomous driving system 100 may include a visualization system 120 that is configured to obtain information from the sensor drivers and world engine 102, the prediction system 110, the decision system 112, the planning system 114, the control system 116, the drive-by-wire system 118, or any other computer system of the autonomous driving system 100. The visualization system 120 may generate two-dimensional and/or three-dimensional models of the autonomous vehicle, objects in the vicinity of the autonomous vehicle, and/or the environment in which the autonomous vehicle operates. Additionally or alternatively, the visualization system 120 may provide a visual representation of movement and/or predicted trajectories of the autonomous vehicle and/or any of the nearby objects.

In some embodiments, the autonomous driving system 100 may include a diagnostics system 122 that is configured to obtain information from the sensor drivers and world engine 102, the prediction system 110, the decision system 112, the planning system 114, the control system 116, the drive-by-wire system 118, or any other computer system of the autonomous driving system 100. The diagnostics system 122 may run diagnostic tests to assess the accuracy and/or validity of determinations and decisions made by other computer systems of the autonomous driving system 100.

In these and other embodiments, the diagnostics system 122 may be communicatively coupled to a simulations system 124 that provides a virtual environment in which the determinations and decisions made by other computer systems and/or software modules of the autonomous driving system 100 may be simulated to identify any issues with the simulated determinations and decisions. Additionally or alternatively, the simulations system 124 may obtain information from the drive-by-wire system 118 so that the simulations system 124 may run simulations based on control signals implemented by the autonomous vehicle in the real world. The simulations system 124 may virtually determine movements of the autonomous vehicle and/or of one or more objects in the vicinity of the autonomous vehicle. Based on the virtually determined movements, the simulations system 124 may determine updated positions of the autonomous vehicle and/or of the surrounding objects. In some embodiments, the simulations system 124 may provide the virtually determined movements and/or the updated positions to the sensor drivers and world engine 102 so that the total measurable world as represented by the sensor drivers and world engine 102 may be updated based on the simulation results.

In some embodiments, the autonomous driving system 100 may include a fleet management system 126 that obtains information from multiple autonomous vehicles communicatively coupled to the fleet management system 126. The fleet management system 126 may relay information between different autonomous vehicles in communication with the fleet management system 126 to coordinate operations of the multiple autonomous vehicles. In these and other embodiments, a user managing fleet operations may use a mobile app 128 to receive information from and/or send information or commands to a fleet of autonomous vehicles.

Modifications, additions, or omissions may be made to the autonomous driving system 100 without departing from the scope of the present disclosure. For example, the designations of different elements in the manner described is meant to help explain concepts described herein and is not limiting. For instance, in some embodiments, the sensor drivers and world engine 102, the mapping system 104, the localization system 106, the routing system 108, the prediction system 110, the decision system 112, the planning system 114, the control system 116, the drive-by-wire system 118, the visualization system 120, the diagnostics system 122, the simulations system 124, the fleet management system 126, and the mobile app 128 are delineated in the specific manner described to help with explaining concepts described herein but such delineation is not meant to be limiting. Further, the autonomous driving system 100 may include any number of other elements or may be implemented within other systems or contexts than those described.

Figure 2A:
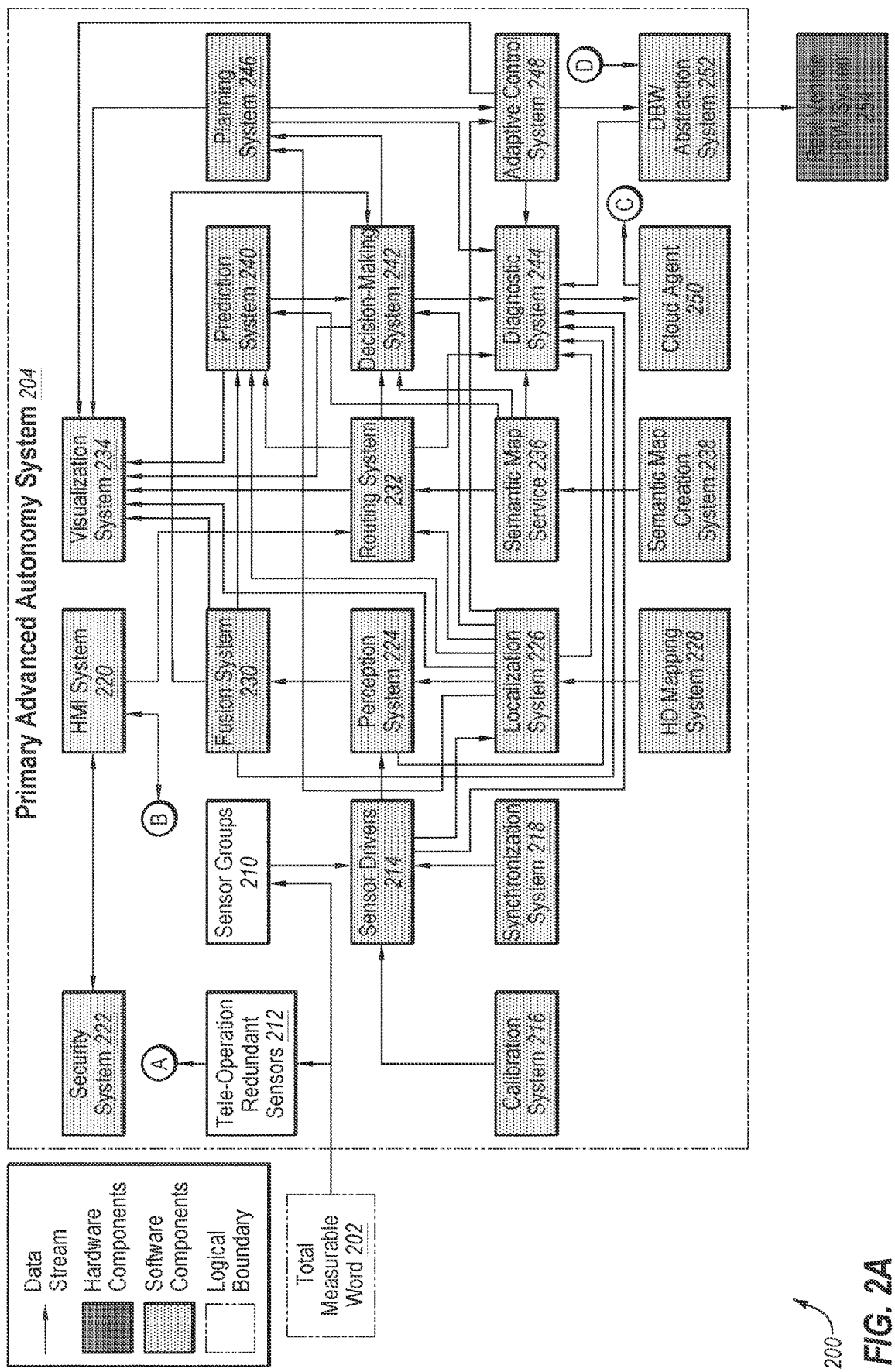
Figure 2C:
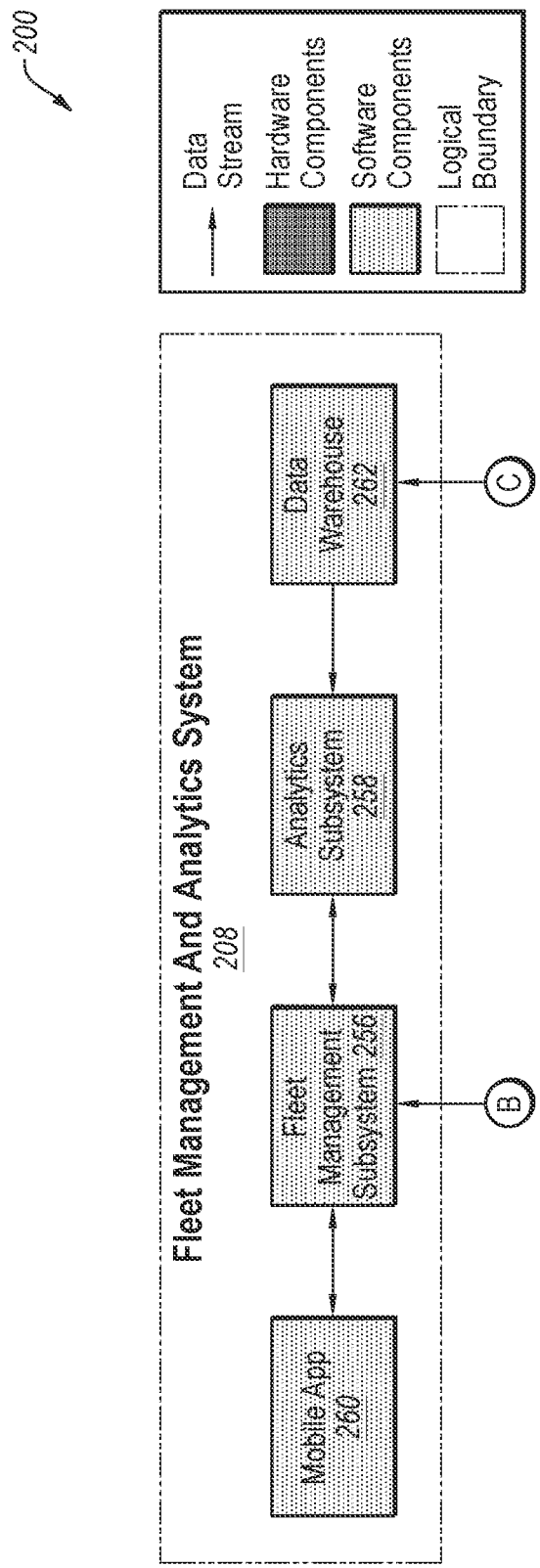

FIGS. 2A-2C illustrate an example large-scale autonomous driving validation system 200 with autonomy intelligence for high-performance cloud computation according to the present disclosure. The large-scale autonomous driving validation system 200 may include an on-board primary advanced autonomy system 204 configured to autonomously pilot an AV and an off-board high-performance autonomous cloud computing system 206. In some embodiments, the primary advanced autonomy system 204 and the off-board high-performance autonomous cloud computing system 206 may each include one or more computing subsystems that perform the same or similar computations and/or computing processes. For example, the primary advanced autonomy system 204 and the high-performance autonomous cloud computing system 206 may each include a localization system, a perception system, a fusion system, a routing system, a prediction system, a decision system, and/or any other computing subsystems.

In some embodiments, the large-scale autonomous driving validation system 200 may obtain sensor data from one or more sensor groups 210 and/or tele-operation redundant sensors 212. Additionally or alternatively, the large-scale autonomous driving validation system 200 may obtain computational results from the high-performance autonomous cloud computing system 206. The large-scale autonomous driving validation system 200 may facilitate making one or more decisions to control operations of the AV (e.g., by a remote operator) and transmit the decisions to a drive-by-wire (DBW) system to actuate and facilitate driving of the AV.

In these and other embodiments, the sensor groups 210 and/or the tele-operation redundant sensors 212 may collect sensor data from a total measurable world 202 around the AV to which the primary advanced autonomy system 204 corresponds. The primary advanced autonomy system 204 may include computing subsystems, such as one or more sensor drivers 214, a calibration system 216, a synchronization system 218, a human-machine interface (HMI) system 220, a security system 222, a perception system 224, a localization system 226, a high-definition mapping system 228, a fusion system 230, a routing system 232, a visualization system 234, a semantic map service 236, a semantic map creation system 238, a prediction system 240, a decision-making system 242, a diagnostic system 244, a planning system 246, an adaptive control system 248, a cloud agent 250, a drive-by-wire (DBW) abstraction system 252, a real vehicle DBW system 254, any other computing subsystems that may be configured to facilitate operation of the given AV, or some combination thereof. Additionally or alternatively, the large-scale autonomous driving validation system 200 may include the sensor drivers and world engine 102, the mapping system 104, the localization system 106, the routing system 108, the prediction system 110, the decision system 112, the planning system 114, the control system 116, the drive-by-wire system 118, the visualization system 120, the diagnostics system 122, the simulations system 124, the fleet management system 126, and/or the mobile app 128 as described in relation to the autonomous driving system 100 of FIG. 1.

In some embodiments, the sensor groups 210 may include one or more sensors that are configured to collect the information about a total measurable world 202, and sensor drivers 214, the calibration system 216, and/or the synchronization system 218 may be configured to process sensor data collected by the sensor groups 210 and send the information to one or more computing subsystems of the given AV. The sensor drivers 214 may facilitate connecting between the sensor groups 210, the calibration system 216, and the synchronization system 218 such that information collected by the sensor groups 210 may be obtained by other computing subsystems of the primary advanced autonomy system 204. The calibration system 216 may be configured to calibrate one or more of the sensors included in the sensor groups 210 to ensure sensor data collected by the sensor groups 210 accurately reflects details of the total measurable world 202. Because the sensor data collected by different sensors included in the sensor groups 210 may be collected at different capture rates, the synchronization system 218 may align the collected sensor data such that the sensor data may be readily interpreted and analyzed by other computing subsystems.

Sensor data collected by the tele-operation redundant sensors 212 may be sent to a tele-operation system 264 so that a tele-operating user may assist with one or more driving operations of the AV if desired. Additionally or alternatively, the sensor data collected by the tele-operation redundant sensors 212 may be sent to the high-performance autonomous cloud computing system 206 before or after the sensor data is sent to the tele-operation system 264. In some embodiments, the tele-operation redundant sensors 212 may be positioned to and configured to collect sensor data that is the same as or similar to the sensor data collected by the sensor groups 210. By collecting sensor data that is redundant with the sensor data collected by the sensor groups 210, reviewing the accuracy and/or completeness of sensor data collected by the sensor groups 210 may be facilitated by the tele-operation system 264 and/or by the high-performance autonomous cloud computing system 206.

The HMI system 220 may include a user interface that allows a human user to input information that may influence driving operations of the AV. The security system 222 may prevent user input via the HMI system 220 from affecting computations and/or driving operations of the AV. The perception system 224 may be configured to detect objects in an environment around the AV, and the localization system 226 may be configured to determine a location of the AV. The high-definition mapping system 228 may populate a map that provides additional context about the given environment in which the AV operates and may maintain a map such that if the AV traverses an area where it has previously traveled the AV can rely at least in part on the previously generated map. The fusion system may be configured to fuse elements obtained from the perception system 224, and the routing system 232 may determine a route for the AV to reach an intended destination of the AV through the environment and/or the total measurable world 202. The visualization system 234 may display computational results and/or information relating to the driving operations of the AV in a way that users may understand. The semantic map service 236 and the semantic map creation system 238 may generate a semantic map that provides semantic meaning for one or more objects or elements of the total measurable world 202 in which the semantic meaning provides a traffic and/or driving context for the objects or elements of the total measurable world 202 (e.g., the application of traffic rules to a bike lane or a four-way stop, rather than merely categorization of objects as a roadway or a stop sign). The prediction system 240 may be configured to determine projected trajectories for the objects, and based on the projected trajectories for the objects, the decision-making system 242 may be configured to determine one or more driving decisions. The diagnostic system 244 may be configured to review information provided by other computing subsystems and identify computing errors. The planning system 246 may be configured to plan and schedule driving operations for the AV, any other computing subsystems, or some combination thereof. Driving decisions, such as decisions made by the decision-making system 242, may be sent to the adaptive control system 248 in a sequence that facilitates safe and efficient driving operations for the AV to reach the intended destination. The DBW abstraction system 252 may receive control information from the adaptive control system 248 and provide instructions to the real vehicle DBW system 254, which may actuate and affect driving operations of the AV, such as accelerating, braking, steering, or any other actions performable by the AV. In some embodiments, the large-scale autonomous driving validation system 200 may include the cloud agent 250, which may facilitate communication between the on-board primary advanced autonomy system 204, a fleet management and analytics system 208 that is configured to facilitate autonomous operations of a group of autonomous vehicles under the supervision of one or more users, and/or the high-performance autonomous cloud computing system 206 located off-board the AV.

The high-performance autonomous cloud computing system 206 may perform computing processes in parallel with the primary advanced autonomy system 204 located on board a given AV, and outputs of the computing processes of the high-performance autonomous cloud computing system 206 may be compared with the outputs of the computing processes of the primary advanced autonomy system 204 to determine whether the primary advanced autonomy system 204 is accurately performing computations. In these and other embodiments, the cloud agent 250 of the primary advanced autonomy system 204 on board the given AV may be configured to send computational results relating to one or more of the computing subsystems corresponding to the primary advanced autonomy system 204 to the high-performance autonomous cloud computing system 206, which may be configured to compare the obtained computational results from the primary advanced autonomy system 204 with computational results calculated by the computing subsystems corresponding to the high-performance autonomous cloud computing system 206. In some situations, performing the computing processes in parallel between the primary advanced autonomy system 204 and the high-performance autonomous cloud computing system 206 may result in different computational outputs due to computational errors and/or differences in obtained sensor information. For example, the primary advanced autonomy system 204 may process computations using fewer computational resources, less robust processors, less complex algorithms, shorter predictions, or other variations compared to the high-performance autonomous cloud computing system 206, which may or may not result in differences in computational results. As an additional or alternative examples, the sensor groups 210 may be damaged and/or obstructed such that the sensor information collected by the sensor groups 210 differ from the sensor information collected by the tele-operation redundant sensors 212, which may or may not result in differences in computational results.

In some embodiments, the large-scale autonomous driving validation system 200 may include two or more channels and/or types of data communications in which a first type of data communications includes computationally intensive calculations related to autonomous driving of the AV and a second type of data communications includes control commands including instructions for driving the AV. In these and other embodiments, the first type of data communications may be configured for high frequency and/or low latency communications to better facilitate the computationally intensive calculations, and the second type of data communications may be configured for lower frequency and/or higher latency communications than the first type of data communications.

Additionally or alternatively, the high-performance autonomous cloud computing system 206 of the large-scale autonomous driving validation system 200 may facilitate more comprehensive decision-making by the primary advanced autonomy system 204 on board the AV and/or by a tele-operating user. In some embodiments, the high-performance autonomous cloud computing system 206 may include more robust computational specifications and/or more computational resources than the on-board primary advanced autonomy system 204 such that computations performed by the high-performance autonomous cloud computing system 206 may include higher granularity and/or accuracy relative to computations performed by the primary advanced autonomy system 204. For example, a given on-board primary advanced autonomy system 204 may predict object trajectories two seconds out from a current timeframe, and a given high-performance autonomous cloud computing system 206 communicatively coupled with the same AV may predict object trajectories six seconds out from the current timeframe. As such, a tele-operating user remotely controlling operations of the AV may make better decisions based on the additional object-trajectory prediction time.

Additionally or alternatively, the higher granularity and/or accuracy of the high-performance autonomous cloud computing system 206 may improve operations of the primary advanced autonomy system 204 of the AV. In some embodiments, the AV may be incapable of making decisions using the primary advanced autonomy system 204 due to lack of information and/or the presence of unreliable information. Thus, the computations of the high-performance autonomous cloud computing system 206 may be received by the primary advanced autonomy system 204 of the AV to provide additional information and/or improve existing information.

In some embodiments, the high-performance autonomous cloud computing system 206 may provide a recommended course of action to be approved by a human operator for remote tele-operation control. For example, using the on-board computing processes, the AV may become stuck with no foreseeable path to becoming unstuck using a 3-second time window of prediction and path planning. After sending information to the high-performance autonomous cloud computing system 206 and using a 7-second time window of prediction and path planning, a path that would lead to the AV becoming unstuck may be observed and proposed as a planned course of action to a human operator. The human operator may approve the proposed plan of action, and the high-performance autonomous cloud computing system 206 may send an instruction to the primary advanced autonomy system 204 to perform the proposed course of action.

In some embodiments, the primary advanced autonomy system 204 and/or the high-performance autonomous cloud computing system 206 may be communicatively coupled with the fleet management and analytics system 208 that includes a fleet management subsystem 256 configured to receive information relating to one or more AVs and/or send information and driving instructions to the one or more AVs. The fleet management and analytics system 208 may additionally or alternatively include an analytics subsystem 258 configured to perform computations relating to a given AV included in the fleet with respect to one or more other AVs included in the fleet that may or may not be within the vicinity of the given AV. For example, the analytics subsystem 258 may be configured to perform computations that may improve traffic flow for a given AV that is an ambulance by rerouting other AVs included in the fleet. In some embodiments, the fleet management and analytics system 208 may include a mobile app 260 that allows a user to review the operations of one or more AVs included in the fleet and a data warehouse 262 that compiles information relating to the AVs included in the fleet that may or may not be retrieved for computations by the fleet management subsystem 256 and/or the analytics sub system 258.

Modifications, additions, or omissions may be made to the large-scale autonomous driving validation system 200 without departing from the scope of the present disclosure. For example, the designations of different elements in the manner described is meant to help explain concepts described herein and is not limiting. For instance, in some embodiments, the primary advanced autonomy system 204, the high-performance autonomous cloud computing system 206, and/or the fleet management and analytics system 208 are delineated in the specific manner described to help with explaining concepts described herein but such delineation is not meant to be limiting. Further, the large-scale autonomous driving validation system 200 may include any number of other elements or may be implemented within other systems or contexts than those described.

Figure 3:
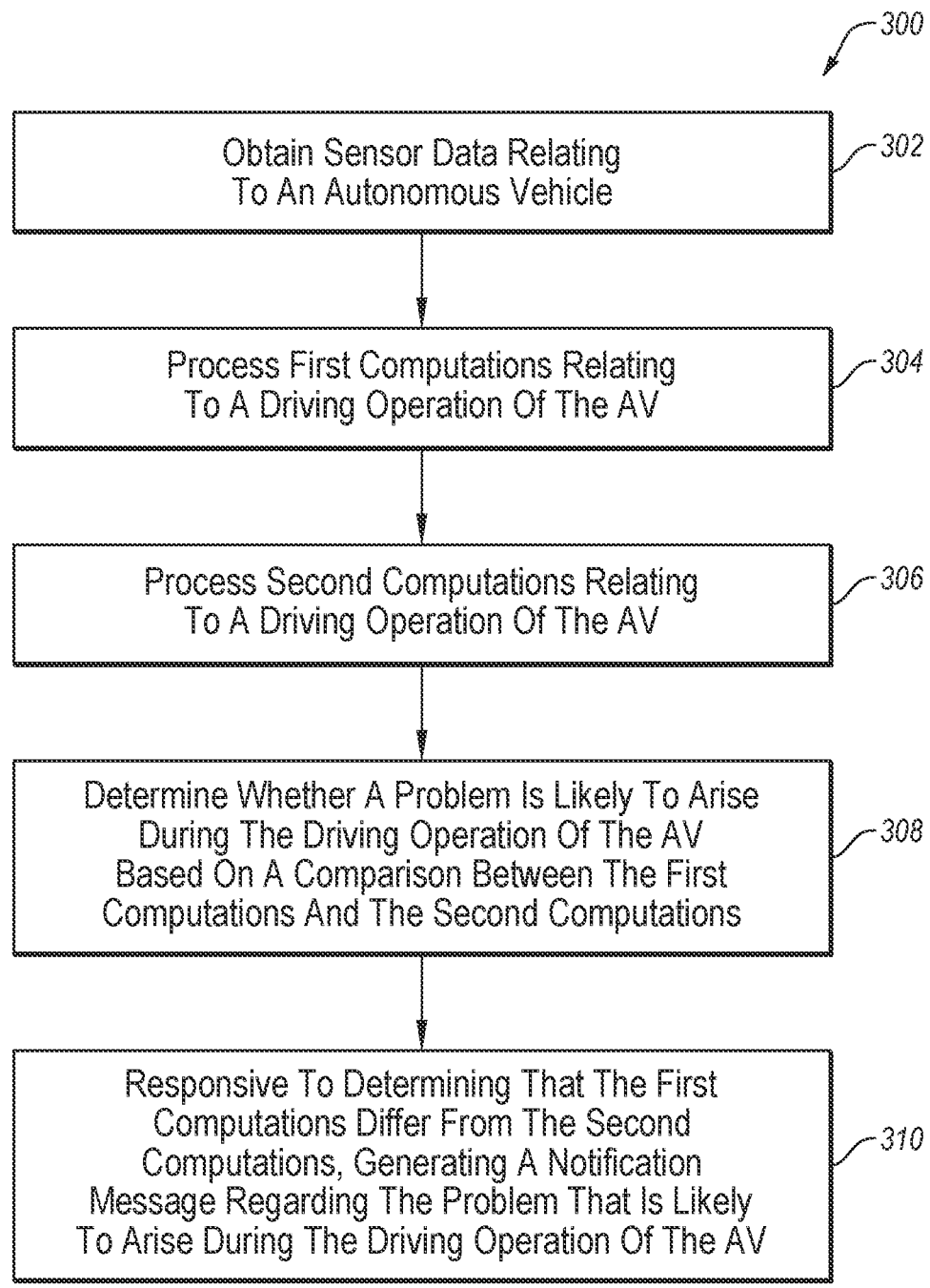
FIG. 3 is a flowchart of an example method of facilitating autonomous operation of a given AV using a large-scale autonomous driving validation system according to a computing system architecture as described in relation to one or more embodiments of the present disclosure.

FIG. 3 is a flowchart of an example method 300 of facilitating autonomous operation of a given AV using a large-scale autonomous driving validation system according to a computing system architecture as described in relation to one or more embodiments of the present disclosure. The method 300 may be performed by any suitable system, apparatus, or device. For example, the primary advanced autonomy system 204, the high-performance autonomous cloud computing system 206, and/or the fleet management and analytics system 208 of FIGS. 2A-2C may perform one or more operations associated with the method 300. Although illustrated with discrete blocks, the steps and operations associated with one or more of the blocks of the method 300 may be divided into additional blocks, combined into fewer blocks, or eliminated, depending on the particular implementation.

The method 300 may begin at block 302, where a primary advanced autonomy system located on board an AV and an off-board autonomous cloud computing system obtains sensor data relating to the AV and a total measurable world around the AV. In some embodiments, the sensor data may be the same as or similar to the sensor data obtained by the sensor groups 210 of the large-scale autonomous driving validation system 200 of FIGS. 2A-2C. The obtained sensor data may relate to the total measurable world 202. Additionally or alternatively, the sensor data may relate to a state of the AV, the driving operations of the AV, and/or any other aspects relating to the AV.

At block 304, the primary advanced autonomy system may process first computations relating to a driving operation of the AV based on the obtained sensor data. In some embodiments, the primary advanced autonomy system of the AV may include computing subsystems such as the sensor drivers 214, the calibration system 216, the synchronization system 218, the human-machine interface (HMI) system 220, the security system 222, the perception system 224, the localization system 226, the high-definition mapping system 228, the fusion system 230, the routing system 232, the visualization system 234, the semantic map service 236, the semantic map creation system 238, the prediction system 240, the decision-making system 242, the diagnostic system 244, the planning system 246, the adaptive control system 248, the cloud agent 250, the DBW abstraction system 252, the real vehicle DBW system 254, any other computing subsystems that may be configured to facilitate operation of the given AV, or some combination thereof.

At block 306, the off-board autonomous cloud computing system may process second computations based on the obtained sensor data. In some embodiments, the off-board autonomous cloud computing system may include the same or similar computing subsystems as the primary advanced autonomy system on board the AV so that the off-board autonomous cloud computing system may process second computations that are the same as or similar to the first computations processed by the on-board primary advanced autonomy system. Additionally or alternatively, the computing subsystems included with the off-board autonomous cloud computing system may include one or more computing subsystems that process computations more accurately than corresponding computing subsystems included with the on-board primary advanced autonomy system. For example, the computing subsystems of the off-board autonomous cloud computing system may have access to more computing resources and/or more robust computing resources than the computing subsystems of the on-board primary advanced autonomy system because multiple processors may be associated with the off-board autonomous cloud computing system. By processing computations more accurately than the on-board primary advanced autonomy system, the computational results generated by the off-board autonomous cloud computing system may be used to audit the computational results generated by the on-board primary advanced autonomy system. Additionally or alternatively, the off-board autonomous cloud computing system may be a software beta-testing system, and the second computations processed by the off-board autonomous cloud computing system may include updated computations relative to the first computations processed by the on-board primary advanced autonomy system.

At block 308, the off-board autonomous cloud computing system may determine whether a problem is likely to arise during the driving operation of the AV based on a comparison between the first computations and the second computations. For example, determining whether the problem is likely to arise during the driving operation of the AV may include determining a data-collection reliability of the one or more sensors, identifying a malfunctioning component of the AV, identifying miscalibration of one or more of the sensors, some combination thereof, or any other problems that the AV may experience while driving. In some embodiments, the comparison between the first computations and the second computations may involve comparing the first computations and the second computations over a period of time such that changes in computing performances over time may be assessed between the first computations and the second computations.

At block 310, a notification message regarding the problem that is likely to arise during the driving operation of the AV may be generated based on a difference between the first computations and the second computations responsive to determining that the first computations differ from the second computations. In some embodiments, the notification message may be sent to a human user who is supervising the driving operation of the AV, and the human user may assess whether the problem corresponding to the notification message may hinder autonomous driving of the AV. Additionally or alternatively, the notification message may be sent to a fleet management and analytics system, which may or may not be included as part of the off-board autonomous cloud computing system, that is configured to obtain information from and send information to one or more first AVs included in a group of AVs in which the information may relate to one or more second AVs included in the group.

Modifications, additions, or omissions may be made to the method 300 without departing from the scope of the disclosure. For example, the designations of different elements in the manner described is meant to help explain concepts described herein and is not limiting. Further, the method 300 may include any number of other elements or may be implemented within other systems or contexts than those described.

Figure 4:
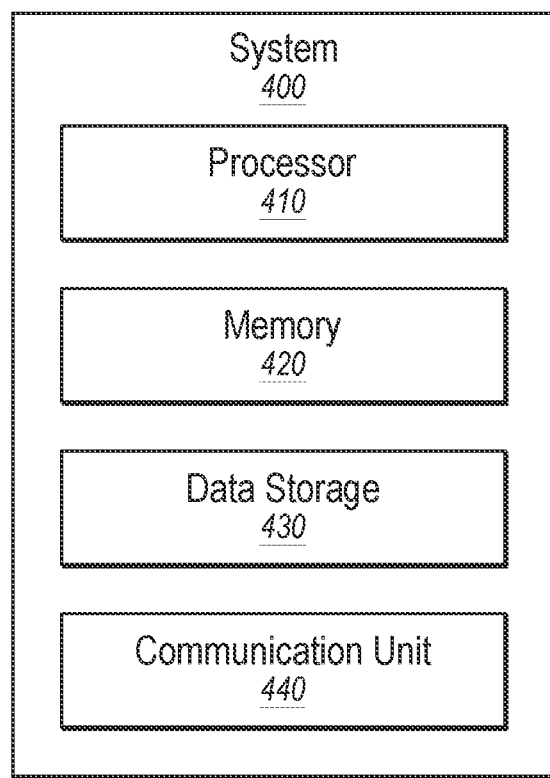
FIG. 4 is an example computing system.

FIG. 4 illustrates an example computing system 400, according to at least one embodiment described in the present disclosure. The computing system 400 may include a processor 410, a memory 420, a data storage 430, and/or a communication unit 440, which all may be communicatively coupled. Any or all of the large-scale autonomous driving validation system 200 of FIGS. 2A-2C may be implemented as a computing system consistent with the computing system 400, including the primary advanced autonomy system 204, the high-performance autonomous cloud computing system 206, and/or the fleet management and analytics system 208.

Generally, the processor 410 may include any suitable special-purpose or general-purpose computer, computing entity, or processing device including various computer hardware or software modules and may be configured to execute instructions stored on any applicable computer-readable storage media. For example, the processor 410 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 4, it is understood that the processor 410 may include any number of processors distributed across any number of network or physical locations that are configured to perform individually or collectively any number of operations described in the present disclosure. In some embodiments, the processor 410 may interpret and/or execute program instructions and/or process data stored in the memory 420, the data storage 430, or the memory 420 and the data storage 430. In some embodiments, the processor 410 may fetch program instructions from the data storage 430 and load the program instructions into the memory 420.

After the program instructions are loaded into the memory 420, the processor 410 may execute the program instructions, such as instructions to perform operations associated with the primary advanced autonomy system, the high-performance autonomous cloud computing system, and/or the fleet management and analytics system.

The memory 420 and the data storage 430 may include computer-readable storage media or one or more computer-readable storage mediums for having computer-executable instructions or data structures stored thereon. Such computer-readable storage media may be any available media that may be accessed by a general-purpose or special-purpose computer, such as the processor 410. For example, the memory 420 and/or the data storage 430 may store the sensor data and/or the computational results of the on-board primary advanced autonomy system and/or the off-board high-performance autonomous cloud computing system. In some embodiments, the computing system 400 may or may not include either of the memory 420 and the data storage 430.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 410 to perform a certain operation or group of operations.

The communication unit 440 may include any component, device, system, or combination thereof that is configured to transmit or receive information over a network. In some embodiments, the communication unit 440 may communicate with other devices at other locations, the same location, or even other components within the same system. For example, the communication unit 440 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 440 may permit data to be exchanged with a network and/or any other devices or systems described in the present disclosure. For example, the communication unit 440 may allow the system 400 to communicate with other systems, such as computing devices and/or other networks.

One skilled in the art, after reviewing this disclosure, may recognize that modifications, additions, or omissions may be made to the system 400 without departing from the scope of the present disclosure. For example, the system 400 may include more or fewer components than those explicitly illustrated and described.

The embodiments described in the present disclosure may include the use of a special purpose or general-purpose computer including various computer hardware or software modules. Further, embodiments described in the present disclosure may be implemented using computer-readable media for having computer-executable instructions or data structures stored thereon.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. An autonomous driving validation system, comprising:
   a primary advanced autonomy system located on board an autonomous vehicle (AV) that includes one or more sensors, one or more computing subsystems, and a drive-by-wire system, the primary advanced autonomy system being configured to process first computations relating to a driving operation of the AV and to store first instructions that, in response to being executed, cause the autonomous driving validation system to perform first operations, the first operations comprising:
      obtaining sensor data relating to the AV and a total measurable world around the AV; and
      processing the first computations relating to the driving operation of the AV based on the obtained sensor data; and
   an off-board autonomous cloud computing system that includes one or more cloud computing subsystems, the off-board autonomous cloud computing system being configured to process second computations that are the same as or similar to the first computations processed by the primary advanced autonomy system and to store second instructions that, in response to being executed, cause the autonomous driving validation system to perform second operations, the second operations comprising;
      obtaining the sensor data relating to the AV and the total measurable world around the AV;
      processing the second computations based on the obtained sensor data, the second computations being performed by the off-board autonomous cloud computing system in parallel with the first computations performed by the primary advanced autonomy system;
      determining whether a likelihood of a problem arising during the driving operation of the AV is above a threshold based on a comparison between the first computations and the second computations; and
      responsive to determining that the likelihood of the problem arising is above the threshold, generating a notification message regarding the problem that is likely to arise during the driving operation of the AV based on a difference between the first computations and the second computations, the notification message being configured to be presented to a human user for review of the problem that is likely to arise during the driving operation of the AV.

2. The autonomous driving validation system of claim 1, further comprising a fleet management and analytics system located off-board the AV, the fleet management and analytics system being configured to obtain information from and send information to one or more first AVs included in a group of AVs, the information relating to one or more second AVs included in the group.

3. The autonomous driving validation system of claim 2, wherein the fleet management and analytics system is included as part of the off-board autonomous cloud computing system.

4. The autonomous driving validation system of claim 1, wherein the comparison between the first computations and the second computations involves comparing the first computations and the second computations over a period of time.

5. The autonomous driving validation system of claim 1, wherein determining whether the likelihood of the problem arising during the driving operation of the AV is above the threshold is determined by a machine-learning process and includes determining at least one of: a data-collection reliability of the one or more sensors, identifying a malfunctioning component of the AV, and identifying miscalibration of one or more of the sensors.

6. The autonomous driving validation system of claim 1, wherein;
   the off-board autonomous cloud computing system is a software beta-testing system; and
   the second computations include updated computations relative to the first computations.

7. The autonomous driving validation system of claim 1, wherein:
   the off-board autonomous cloud computing system is a software-auditing system; and
   the second computations are the same as the first computations.

8. A method, comprising:
   obtaining, by a primary advanced autonomy system located on board an autonomous vehicle (AV) and by an off-board autonomous cloud computing system, sensor data relating to the AV and a total measurable world around the AV;
   processing, by the primary advanced autonomy system, first computations relating to a driving operation of the AV based on the obtained sensor data;
   processing, by the off-board autonomous cloud computing system, second computations based on the obtained sensor data, the second computations being performed by the off-board autonomous cloud computing system in parallel with the first computations performed by the primary advanced autonomy system;
   determining, by the off-board autonomous cloud computing system, whether a likelihood of a problem arising during the driving operation of the AV is above a threshold based on a comparison between the first computations and the second computations; and
   responsive to determining that the likelihood of the problem arising is above the threshold, generating a notification message regarding the problem that is likely to arise during the driving operation of the AV based on a difference between the first computations and the second computations, the notification message being configured to be presented to a human user for review of the problem that is likely to arise during the driving operation of the AV.

9. The method of claim 8, wherein the comparison between the first computations and the second computations involves comparing the first computations and the second computations over a period of time.

10. The method of claim 8, wherein determining whether the likelihood of the problem arising during the driving operation of the AV is above the threshold is determined by a machine-learning process and includes determining at least one of: a data-collection reliability of one or more sensors that collected the sensor data, identifying a malfunctioning component of the AV, and identifying miscalibration of one or more of the sensors.

11. The method of claim 8, wherein;
   the off-board autonomous cloud computing system is a software beta-testing system; and
   the second computations include updated computations relative to the first computations.

12. The method of claim 8, wherein:
   the off-board autonomous cloud computing system is a software-auditing system; and the second computations are the same as the first computations.

13. The method of claim 8, further comprising sending the notification message to a fleet management and analytics system that is configured to obtain information from and send information to one or more first AVs included in a group of AVs, the information relating to one or more second AVs included in the group.

14. The method of claim 13, wherein the fleet management and analytics system is included as part of the off-board autonomous cloud computing system.

15. One or more non-transitory computer-readable storage media configured to store instructions that, in response to being executed, cause a system to perform operations, the operations comprising:
   obtaining, by a primary advanced autonomy system located on board an autonomous vehicle (AV) and by an off-board autonomous cloud computing system, sensor data relating to the AV and a total measurable world around the AV;
   processing, by the primary advanced autonomy system, first computations relating to a driving operation of the AV based on the obtained sensor data;
   processing, by the off-board autonomous cloud computing system, second computations based on the obtained sensor data, the second computations being performed by the off-board autonomous cloud computing system in parallel with the first computations performed by the primary advanced autonomy system;
   determining, by the off-board autonomous cloud computing system, whether a likelihood of a problem arising during the driving operation of the AV is above a threshold based on a comparison between the first computations and the second computations; and
   responsive to determining that the likelihood of the problem arising is above the threshold, generating a notification message regarding the problem that is likely to arise during the driving operation of the AV based on a difference between the first computations and the second computations, the notification message being configured to be presented to a human user for review of the problem that is likely to arise during the driving operation of the AV.

16. The one or more non-transitory computer-readable storage media of claim 15, wherein the comparison between the first computations and the second computations involves comparing the first computations and the second computations over a period of time.

17. The one or more non-transitory computer-readable storage media of claim 15, wherein determining whether the likelihood of the problem arising during the driving operation of the AV is above the threshold is determined by a machine-learning process and includes determining at least one of: a data-collection reliability of one or more sensors that collected the sensor data, identifying a malfunctioning component of the AV, and identifying miscalibration of one or more of the sensors.

18. The one or more non-transitory computer-readable storage media of claim 15, wherein;
   the off-board autonomous cloud computing system is a software beta-testing system; and
   the second computations include updated computations relative to the first computations.

19. The one or more non-transitory computer-readable storage media of claim 15, wherein:
   the off-board autonomous cloud computing system is a software-auditing system; and
   the second computations are the same as the first computations.

20. The one or more non-transitory computer-readable storage media of claim 15, wherein the operations further comprise sending the notification message to a fleet management and analytics system that is configured to obtain information from and send information to one or more first AVs included in a group of AVs, the information relating to one or more second AVs included in the group.

* * * * *